United States Patent
Wagner et al.

(10) Patent No.: US 11,111,873 B2
(45) Date of Patent: Sep. 7, 2021

(54) METHOD AND CONTROL UNIT FOR REGULATING A FILL LEVEL OF A STORAGE OF A CATALYTIC CONVERTER FOR AN EXHAUST GAS COMPONENT

(71) Applicant: Robert Bosch GmbH, Stuttgart (DE)

(72) Inventors: Alexandre Wagner, Stuttgart (DE); Michael Fey, Wiernsheim (DE)

(73) Assignee: Robert Bosch GmbH, Stuttgart (DE)

( * ) Notice: Subject to any disclaimer, the term of this patent is extended or adjusted under 35 U.S.C. 154(b) by 185 days.

(21) Appl. No.: 16/429,120

(22) Filed: Jun. 3, 2019

(65) Prior Publication Data
US 2019/0368441 A1 Dec. 5, 2019

(30) Foreign Application Priority Data
Jun. 1, 2018 (DE) .......................... 102018208683.4

(51) Int. Cl.
*F02D 43/00* (2006.01)
*F02D 35/00* (2006.01)

(52) U.S. Cl.
CPC ......... *F02D 43/00* (2013.01); *F02D 35/0046* (2013.01)

(58) Field of Classification Search
CPC .. F02D 43/00; F02D 35/0046; F02D 41/1446; F02D 2041/1434; F02D 41/1455; F02D 41/1456; F02D 2200/0814; F02D 2200/0816; F02D 41/1445; F02D 41/1486; F02D 41/0235; Y02T 10/12; F01N 9/005
USPC ....................................................... 701/103
See application file for complete search history.

(56) References Cited

U.S. PATENT DOCUMENTS

| 5,901,552 A * | 5/1999 | Schnaibel ........... F02D 41/1441 60/274 |
| 2010/0212291 A1* | 8/2010 | Schnaibel ........... F02D 41/0295 60/274 |
| 2011/0072785 A1* | 3/2011 | Loehr ................... F01N 3/0871 60/274 |

FOREIGN PATENT DOCUMENTS

| DE | 19606652 A1 | 8/1997 | |
| DE | 10339063 A1 | 2/2005 | |
| EP | 1329627 A2 * | 7/2003 | ......... F02D 41/0235 |

OTHER PUBLICATIONS

EP-1329627-A2 English Translation; Oehlschlaeger Rene (Year: 2003).*

* cited by examiner

*Primary Examiner* — Joseph J Dallo
*Assistant Examiner* — Scott A Reinbold
(74) *Attorney, Agent, or Firm* — Norton Rose Fulbright US LLP; Elizabeth Tretter

(57) ABSTRACT

A filling of an exhaust gas component storage of a catalytic converter is regulated. An actual fill level of the exhaust gas component storage is ascertained using a first system model, and a base lambda setpoint value for a first control loop is predefined by a second control loop. An initial value for the base lambda setpoint value is converted into a fictitious fill level, the fictitious fill level being compared with a setpoint value for the fill level output, and the base lambda setpoint value being iteratively changed as a function of the comparison result, if a difference between the setpoint value for the fill level and the fictitious fill level is greater than a predefined degree. The base lambda setpoint value is not changed if no difference exists between the setpoint value for the fill level and the fictitious fill level.

13 Claims, 5 Drawing Sheets

METHOD AND CONTROL UNIT FOR REGULATING A FILL LEVEL OF A STORAGE OF A CATALYTIC CONVERTER FOR AN EXHAUST GAS COMPONENT

FIELD OF THE INVENTION

The present invention relates to a method for regulating a filling of an exhaust gas component storage of a catalytic converter in the exhaust gas of an internal combustion engine. In terms of its device aspects, the present invention relates to a control unit.

BACKGROUND INFORMATION

Such a method and such a control unit are each known for oxygen as the exhaust gas component from German Published Patent Application No. 103 39 063. In the known method and control unit, an actual fill level of the exhaust gas component storage is ascertained using a first system model, which is fed signals of a first exhaust gas sensor projecting into the exhaust gas flow upstream from the catalytic converter and detecting a concentration of the exhaust gas component, and in which a base lambda setpoint value for a first control loop is predefined by a second control loop.

Such a method and such a control unit are also known from German Published Patent Application No. 196 06 652 of the applicant.

During an incomplete combustion of the air-fuel mixture in a gasoline engine, a multitude of combustion products, in addition to nitrogen ($N_2$), carbon dioxide ($CO_2$) and water ($H_2O$), are emitted, of which hydrocarbons (HC), carbon monoxide (CO) and nitrogen oxides ($NO_x$) are limited by law. The applicable exhaust gas limit values for motor vehicles may be complied with according to the present state of the art only with a catalytic exhaust gas after-treatment. By using a three-way catalytic converter, it is possible to convert the aforementioned pollutant components. A simultaneously high conversion rate for HC, CO and $NO_x$ is achieved in the case of three-way catalytic converters only in a narrow lambda range around the stoichiometric operating point (lambda=1), in the so-called conversion window.

To operate the three-way catalytic converter in the conversion window, a lambda regulation is typically used in modern engine control systems, which is based on the signals of lambda sensors situated upstream and downstream from the three-way catalytic converter. To regulate the air ratio lambda, which is a measure of the composition of the fuel/air ratio of the internal combustion engine, the oxygen content of the exhaust gas is measured upstream from the three-way catalytic converter using a front exhaust gas sensor situated there. As a function of this measured value, the regulation corrects the fuel quantity or injection pulse width in the form of a base value predefined by a pilot control function.

As part of the pilot control, base values of fuel quantities to be injected are predefined as a function of, for example, rotational speed and load of the internal combustion engine. For an even more accurate regulation, the oxygen concentration of the exhaust gas downstream from the three-way catalytic converter is also detected using an additional exhaust gas sensor. The signal of this rear exhaust gas sensor is used for a guide regulation, which is superimposed on the lambda regulation based on the signal of the front exhaust gas sensor upstream from the three-way catalytic converter. A jump lambda sensor is generally used as the rear exhaust gas sensor situated downstream from the three-way catalytic converter, which at lambda=1 has a very steep characteristic curve and thus may very accurately indicate lambda=1 (Automotive Handbook, $23^{rd}$ edition, page 524).

In addition to the guide regulation, which generally corrects only small deviations of lambda=1 and is comparatively slowly adapted, there is in general a functionality in present engine control systems, which after large deviations of lambda=1, ensures in the form of a lambda pilot control that the conversion window is quickly achieved again, which is important, for example, after phases with coasting cutoff, in which the three-way catalytic converter is charged with oxygen. This affects the $NO_x$ conversion.

Due to the oxygen storage capability of the three-way catalytic converter, lambda=1 may still be present for several seconds downstream from the three-way catalytic converter, once a rich or lean lambda has been set upstream from the three-way catalytic converter. This capability of the three-way catalytic converter of temporarily storing oxygen is utilized in order to compensate for short-term deviations of lambda=1 upstream from the three-way catalytic converter. If lambda not equal to 1 is present over a longer period of time upstream from the three-way catalytic converter, the same lambda will also occur downstream from the three-way catalytic converter as soon as the oxygen fill level in the case of a lambda>1 (oxygen surplus) exceeds the oxygen storage capability or, in the case of a lambda<1, as soon as oxygen is no longer stored in the three-way catalytic converter.

At this point in time, a jump lambda sensor downstream from the three-way catalytic converter then also indicates a departure from the conversion window. Up to this point in time, however, the signal of the lambda sensor downstream from the three-way catalytic converter does not indicate the imminent breakthrough, and thus a guide regulation based on this signal often responds so late that the fuel metering is no longer able to respond in time before a breakthrough. As a result of this, increased tailpipe emissions occur. Thus, present regulation concepts have the disadvantage that they only belatedly recognize a departure from the conversion window based on the voltage of the jump lambda sensor downstream from the three-way catalytic converter.

One alternative for the regulation on the basis of the signal of a lambda sensor downstream from the three-way catalytic converter is a regulation of the average oxygen fill level of the three-way catalytic converter. This average fill level is in fact not measurable, but may be modeled by calculations according to the aforementioned German Published Patent Application No. 103 39 063.

A three-way catalytic converter, however, is a complex non-linear system having time-variant system parameters. In addition, the measured or modeled input variables for a model of the three-way catalytic converter are usually subject to uncertainties. For this reason, a universally accepted catalytic converter model, which is able to sufficiently accurately describe the behavior of the three-way catalytic converter in different operating states (for example, in different engine operating points or in different catalytic converter aging stages), is generally not available in an engine control system.

SUMMARY

The present invention differs from this related art by the characterizing features of Claim 1 and of the independent device claim. In the present invention, an initial value for the base lambda setpoint value is converted in the second control loop to a fictitious fill level by a second system model identical to the first system model. The fictitious fill level is compared with a setpoint value for the fill level output by a set-point value generator. The base lambda setpoint value is iteratively changed as a function of the comparison result if the comparison result indicates a difference between the setpoint value for the fill level and the fictitious fill level, which is greater than a predefined degree, and the base lambda setpoint value is not changed if the comparison result indicates no difference between the setpoint value for the fill level and the fictitious fill level.

The regulation of the fill level of the three-way catalytic converter on the basis of the signal of an exhaust gas sensor situated upstream from the three-way catalytic converter has the advantage that an imminent departure from the catalytic converter window may be recognized earlier than in the case of a guide regulation, which is based on the signal of an exhaust gas sensor situated downstream from the three-way catalytic converter, so that the departure from the catalytic converter window may be counteracted by an early targeted correction of the air-fuel mixture.

In this respect, the present invention enables an improved regulation of a quantity of oxygen stored in the catalytic converter volume, with which a departure from the conversion window may be recognized early and prevented, and which at the same time has a more balanced fill level reserve against dynamic disturbances than existing regulation concepts. The emissions may be reduced as a result. Stricter legal requirements may be met with lower costs for the three-way catalytic converter.

One preferred embodiment is distinguished by the fact that a deviation of the actual fill level from the predetermined setpoint fill level is ascertained and is processed by a fill level regulation to form a lambda setpoint value correction value, a sum is formed from the base lambda setpoint value and the lambda setpoint value correction value and the sum is used to form a correction value, with which a fuel metering to at least one combustion chamber of the internal combustion engine is influenced.

It is also preferred that the exhaust gas component is oxygen, that a lambda regulation takes place in the first control loop, in which the signal of the first exhaust gas sensor is processed as the lambda actual value and that the lambda setpoint value is formed in the second control loop, and a fill level control deviation being formed as a deviation of the fill level modeled with the first catalytic converter model from the filtered fill level setpoint value, this fill level control deviation being fed to a fill level control algorithm, from which the fill level control algorithm forms a lambda setpoint value correction value and this lambda setpoint value correction value being added to the, if necessary, iteratively changed base lambda setpoint value and the sum thus calculated forming the lambda setpoint value.

It is also preferred that the first system model includes a catalytic converter model.

A system model is understood here to mean an algorithm, which links input variables that also affect the real object reproduced with the system model, with output variables in such a way that the calculated output variables correspond preferably exactly to the output variables of the real object. The real object in the case considered here is the entire physical distance between the input variables and the output variables. The signal of the rear exhaust gas sensor is arithmetically modeled using the output lambda model.

It is further preferred that the first catalytic converter model includes an input emissions model, a fill level model and an emissions model.

Another preferred embodiment is distinguished by the fact that the first catalytic converter model includes sub-models, each of which is assigned a sub-volume of the real three-way catalytic converter.

It is further preferred that the catalytic converter model includes an output lambda model, which is configured to convert concentrations of the individual exhaust gas components calculated with the aid of the first catalytic converter model to a signal, which is comparable to the signal of a second exhaust gas sensor, which is situated downstream from the catalytic converter and is exposed to the exhaust gas.

Another preferred embodiment is distinguished by the fact that the signal calculated using the emissions model is balanced with the signal measured by this additional exhaust gas sensor.

This balance allows for the compensation of inaccuracies of measuring variables or model variables incorporated in the system model.

It is also preferred that the predetermined setpoint value amounts to between 10% and 50%, in particular, between 25% and 35% of the maximum oxygen storage capacity of the three-way catalytic converter.

With respect to embodiments of the control unit, it is preferred that it is configured to control a sequence of a method according to one of the preferred embodiments of the method.

Additional advantages result from the description and from the appended drawings.

It is understood that the features cited above and those to be explained below are applicable not only in each specified combination, but also in other combinations or alone, without departing from the scope of the present invention.

BRIEF DESCRIPTION OF THE DRAWINGS

Exemplary embodiments of the present invention are depicted in the drawings and are explained in greater detail in the following description. In the process, identical reference numerals in various figures each refer to identical elements or elements at least comparable in their function.

DETAILED DESCRIPTION

The present invention is described below by way of example of a three-way catalytic converter and for oxygen as the exhaust gas component to be stored. However, the present invention is analogously also applicable to other types of catalytic converters and exhaust gas components, such as nitrogen oxides and hydrocarbons. For the sake of simplicity, an exhaust system including a three-way catalytic converter is assumed below. The present invention is analogously also applicable to exhaust systems that include multiple catalytic converters. The front and rear zones described below may extend in this case across multiple catalytic converters or may be situated in different catalytic converters.

Figure 1:
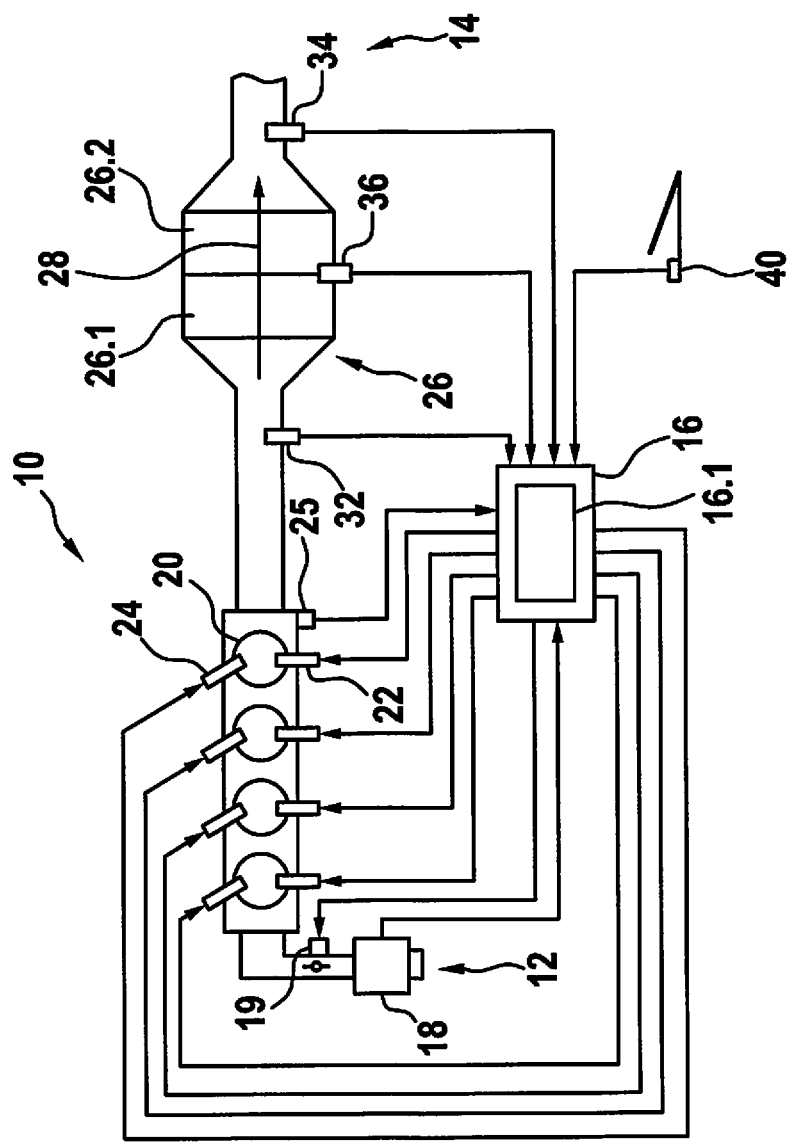
FIG. 1 shows an internal combustion engine, including an exhaust system as the technological backdrop of the present invention.

Specifically, FIG. 1 shows an internal combustion engine 10, including an air supply system 12, an exhaust system 14 and a control unit 16. Located in air supply system 12 is a mass air-flow sensor 18 and a throttle valve of a throttle valve unit 19 situated downstream from mass air-flow sensor 18. The air flowing via air supply system 12 into internal combustion engine 10 is mixed in combustion chambers 20 of internal combustion engine 10 with fuel, which is injected via injectors 22 directly into combustion chambers 20. The present invention is not limited to internal combustion engines having direct injection and may also be used with intake-manifold fuel injection or with gas-driven internal combustion engines. The resulting combustion chamber fillings are ignited and combusted using ignition devices 24, for example, spark plugs. A rotation angle sensor 25 detects the rotation angle of a shaft of internal combustion engine 10 and, as a result, allows control unit 16 to trigger the ignitions in predetermined angular positions of the shaft. The exhaust gas resulting from the combustions is discharged through exhaust system 14.

Exhaust system 14 includes a catalytic converter 26. Catalytic convert 26 is a three-way catalytic converter, for example, which as is well-known converts the three exhaust gas components nitrogen oxides, hydrocarbons and carbon monoxide on three reaction paths, and which has an oxygen storing effect. Due to the oxygen storing effect, and since oxygen is an exhaust gas component, the catalytic converter has an exhaust gas component storage. Three-way catalytic converter 26 in the example depicted includes a first zone 26.1 and a second zone 26.2. Exhaust gas 28 flows through both zones. The first, front zone 26.1 extends in the flow direction across a front section of three-way catalytic converter 26. The second, rear zone 26.2 extends across a rear section of three-way catalytic converter 26 downstream from first zone 26.1. Additional zones may, of course, be situated in front of front zone 26.1 and behind rear zone 26.2, as well as between the two zones, for which, if necessary, the respective fill level is also modeled using a computer model.

A front exhaust gas sensor 32 exposed to exhaust gas 28 upstream from three-way catalytic converter 26 is situated directly upstream from three-way catalytic converter 26. A rear exhaust gas sensor 34 also exposed to exhaust gas 28 downstream from three-way catalytic converter 26 is situated directly downstream from three-way catalytic converter 26. Front exhaust gas sensor 32 is preferably a broadband lambda sensor, which permits a measurement of the air ratio λ across a broad air ratio range. Rear exhaust gas sensor 34 is preferably a so-called jump lambda sensor, with which air ratio λ=1 may be particularly accurately measured, because the signal of this exhaust gas sensor 34 abruptly changes there. Cf. Bosch, Automotive Handbook, $23^{rd}$ edition, page 524.

In the exemplary embodiment depicted, a temperature sensor 36 exposed to exhaust gas 28 is situated in thermal contact with exhaust gas 28 on three-way catalytic converter 26, which detects the temperature of three-way catalytic converter 26.

Control unit 16 processes the signals of mass air-flow sensor 18, of rotation angle sensor 25, of front exhaust gas sensor 32, of rear exhaust gas sensor 34 and of temperature sensor 36 and from these forms activation signals for adjusting the angular position of the throttle valve, for triggering ignitions by ignition device 24 and for injecting fuel through injectors 22. Alternatively or in addition, control unit 16 also processes signals of other or additional sensors for activating the actuators depicted or also for additional or other actuators, for example, the signal of a driver input sensor 40, which detects an accelerator pedal position. A coasting with a cutoff of the fuel supply is triggered, for example, by releasing the accelerator pedal. These and the additional functions explained below are carried out by an engine control program 16.1 running in control unit 16 during the operation of internal combustion engine 10.

In this application, reference is made to a system model 100, a catalytic converter model 102, an inverse catalytic converter model 104 (cf. FIG. 3) and an output lambda model 106. Each of the models is an algorithm, in particular, a system of equations, which is carried out or computed in control unit 16 and which link the input variables, which also affect the real object reproduced with the computer model, to the output variables in such a way that the output variables calculated with the algorithms correspond preferably exactly to the output variables of the real object.

Figure 2:
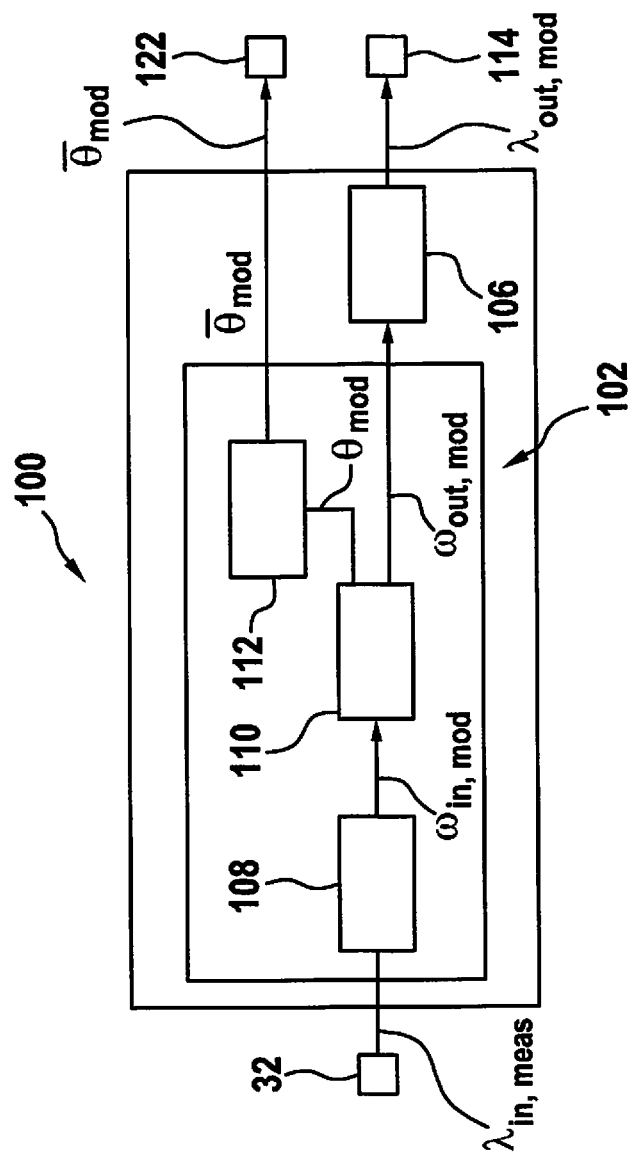
FIG. 2 shows a function block diagram of a system model.

FIG. 2 shows a function block diagram of a system model 100. System model 100 is made up of catalytic converter model 102 and output lambda model 106. Catalytic converter model 102 includes an input emissions model 108 and a fill level and output emissions model 110. Catalytic converter model 102 also includes an algorithm 112 for calculating an average fill level $\bar{\theta}_{mod}$ of catalytic converter 26.

Input emissions model 108 is configured to convert the signal $\lambda_{in,meas}$ of the exhaust gas sensor 32 situated upstream from three-way catalytic converter 26 as the input variable into input variables $w_{in,mod}$ required for the following fill level and output emissions model 110. A conversion of lambda into the concentrations $O_2$, $CO$, $H_2$ and $HC$ upstream from three-way catalytic converter 26 with the aid of input emissions model 108, for example, is advantageous.

Using variables $w_{in,mod}$ calculated by input emissions model 108 and, if necessary, additional input variables (for example, exhaust gas or catalytic converter temperatures, exhaust gas mass flow and instantaneous maximum oxygen storage capability of three-way catalytic converter 26), a fill level $\theta_{mod}$ of three-way catalytic converter 26 and concentrations $w_{out,mod}$ of the individual exhaust gas components at the output of three-way catalytic converter 26 are modeled in fill level and output emissions model 110.

To be able to reproduce filling and emptying processes more realistically, three-way catalytic converter 26 is preferably subdivided by the algorithm conceptually into multiple zones or sub-volumes 26.1, 26.2 situated one behind the other in the flow direction of exhaust gases 28, and the concentrations of the individual exhaust gas components are ascertained for each of these zones 26.1, 26.2 with the aid of reaction kinetics. These concentrations in turn may each be converted into a fill level of the individual zones 26.1, 26.2, preferably, into the oxygen fill level standardized to the instantaneous maximum oxygen storage capability.

The fill levels of individual zones or of all zones 26.1, 26.2 may be combined to form an overall fill level with the aid of a suitable weighting, which reflects the state of three-way catalytic converter 26. In the simplest case, for example, the fill levels of all zones 26.1, 26.2 may all be weighted equally and an average fill level ascertained as a result. With a suitable weighting, however, it may also be considered that the fill level in a comparatively small zone 26.2 at the output of three-way catalytic converter 26 is decisive for the instantaneous exhaust gas composition downstream from three-way catalytic converter 26, whereas for the development of the fill level in this small zone 26.2 at the output of three-way catalytic converter 26, the fill level in the zone 26.1 situated in front thereof and its development is decisive. For the sake of simplicity, an average oxygen fill level is assumed below.

The algorithm of output lambda model 106 converts the concentrations $w_{out,mod}$ of the individual exhaust gas components at the output of catalytic converter 26 calculated using catalytic converter model 102 for adapting system model 100 into a signal $\lambda_{out,mod}$, which may be compared with signal $\lambda_{out,meas}$ of exhaust gas sensor 34 situated downstream from catalytic converter 26. The lambda downstream from catalytic converter 26 is preferably modeled. Output lambda model 106 is not absolutely necessary for a pilot control based on a setpoint oxygen fill level.

Thus, system model 100 on the one hand is used to model at least one average fill level $\bar{\theta}_{mod}$ of catalytic converter 26, which is adjusted to a setpoint fill level, in which catalytic converter 26 is reliably located within the catalytic converter window. On the other hand, system model 100 provides a modeled signal $\lambda_{out,mod}$ of exhaust gas sensor 34 situated downstream from catalytic converter 26. It is also explained in greater detail further below how this modeled signal $\lambda_{out,mod}$ of rear exhaust gas sensor 34 is advantageously used for adapting system model 100. The adaptation takes place to compensate for uncertainties to which the input variables of the system model, in particular, the signal of the lambda sensor upstream from the catalytic converter, are subject. The pilot control and, if necessary, the controller parameters are also adapted.

Figure 3:
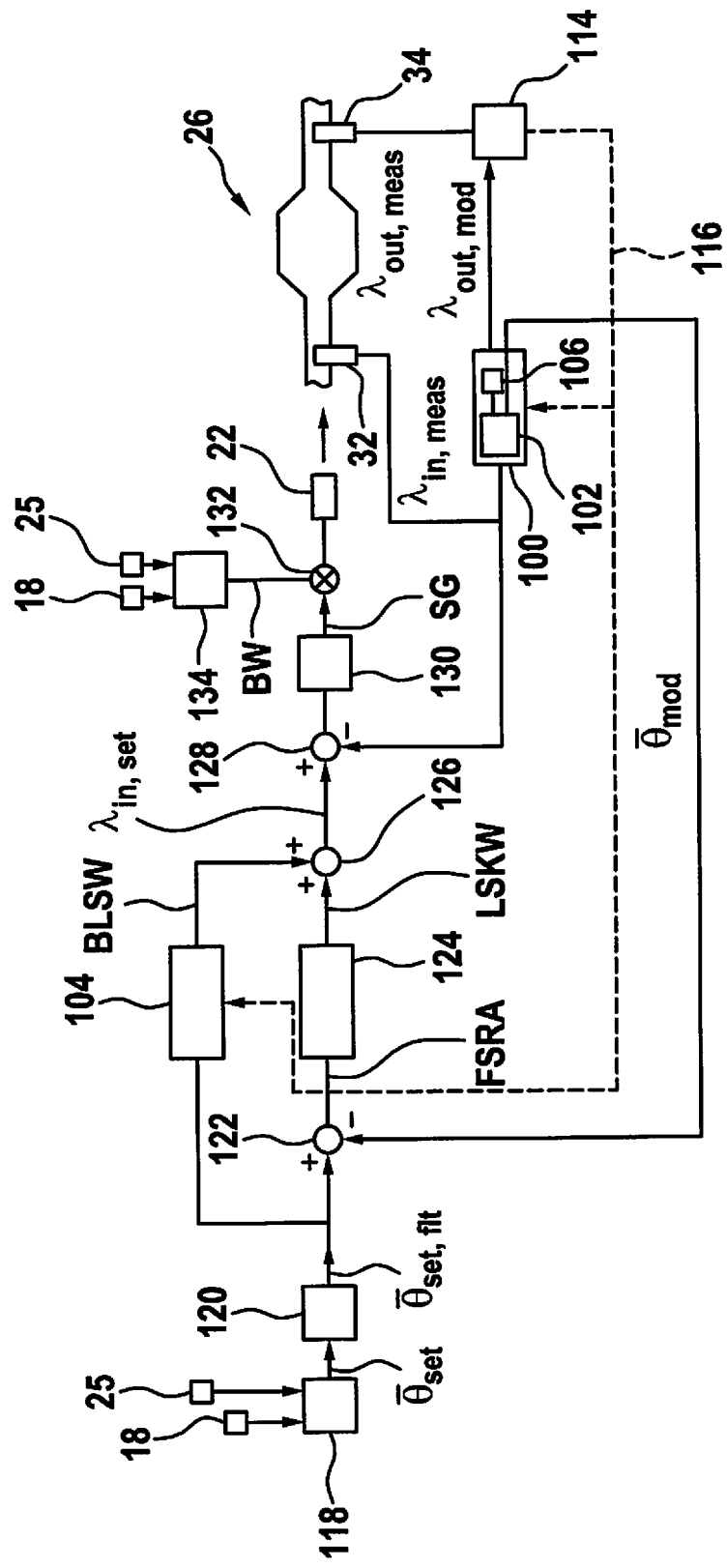
FIG. 3 shows a function block diagram of a method and control unit not according to the present invention.

FIG. 3 shows as background for the present invention a function block diagram of a method not according to the present invention, together with device elements, which affect the function blocks or which are influenced by the function blocks.

Specifically, FIG. 3 shows how the signal $\lambda_{out,mod}$ of rear exhaust gas sensor 34 modeled by output lambda model 106 is balanced with real output signal $\lambda_{out,meas}$ of rear exhaust gas sensor 34. For this purpose, the two signals $\lambda_{out,mod}$ and $\lambda_{out,meas}$ are fed to an adaptation block 114. Adaptation block 114 compares the two signals $\lambda_{out,mod}$ and $\lambda_{out,meas}$ with one another. For example, a jump lambda sensor as exhaust gas sensor 34 situated downstream from three-way catalytic converter 26 clearly indicates when three-way catalytic converter 26 is completely filled with oxygen or is completely emptied of oxygen. This may be utilized in order to correlate the modeled oxygen fill level with the actual oxygen fill level, or the modeled output lambda $\lambda_{out,mod}$ with the lambda $\lambda_{out,meas}$ measured downstream from three-way catalytic converter 26 after lean phases or rich phases, and to adapt system model 100 in the event of deviations. The adaptation takes place, for example, in that adaptation block 114 successively changes parameters of the algorithm of system model 100 via adaptation path 116 depicted with dashed lines until lambda value $\lambda_{out,mod}$ modeled for the exhaust gas flowing out of three-way catalytic converter 26 corresponds to lambda value $\lambda_{out,meas}$ measured there.

This compensates for inaccuracies in measured variables and model variables, which are incorporated into system model 100. From the fact that modeled value $\lambda_{out,mod}$ corresponds to measured lambda value $\lambda_{out,meas}$, it may be concluded that fill level $\bar{\theta}_{mod}$ modeled using system model 100 or using first catalytic converter model 102 corresponds to the fill level of three-way catalytic converter 26 not measurable using on-board means. It may then further be concluded that second catalytic converter model 104 inverse to first catalytic converter model 102, which results from the algorithm of first catalytic converter model 102 via mathematical transformations, correctly describes the behavior of the modeled system.

This may be used to calculate a base lambda setpoint value using inverse second catalytic converter model 104. For this purpose, a fill level setpoint value $\bar{\theta}_{set,fit}$ filtered by an optional filtering 120 is fed as an input variable to inverse second catalytic converter model 104. Filtering 120 takes place for the purpose of allowing only those changes of the input variables of inverse second catalytic converter model 104, which the control system on the whole is able to follow. A still unfiltered setpoint value $\bar{\theta}_{set}$ in this case is read out of a memory 118 of control unit 16. For this purpose, memory 118 is preferably addressed using instantaneous operating parameters of internal combustion engine 10. The operating parameters are, for example, but not necessarily, the rotational speed detected by rotational speed sensor 25 and the load of internal combustion engine 10 detected by mass air-flow sensor 18.

The filtered fill level setpoint value $\bar{\theta}_{set,fit}$ is processed using inverse second catalytic converter model 104 to form a base lambda setpoint value BLSW. In parallel with this processing, a fill level control deviation FSRA is formed in a link 122 as a deviation of fill level $\bar{\theta}_{mod}$ modeled using system model 100, or using first catalytic converter model 102, from filtered fill level setpoint value $\bar{\theta}_{set,fit}$. This fill level control deviation FSRA is fed to a fill level control algorithm 124, which therefrom forms a lambda setpoint correction value LSKW. This lambda setpoint correction value LSKW is added in link 126 to the base lambda setpoint value BLSW calculated by inverse system model 104.

The sum thus formed, may be used as setpoint value $\lambda_{in,set}$ of a conventional lambda regulation. The lambda actual value $\lambda_{in,meas}$ provided by first exhaust gas sensor 32 is subtracted in a link 128 from this lambda setpoint value $\lambda_{in,set}$. Control deviation RA thus formed is converted via a conventional control algorithm 130 into a manipulated variable SG, which is multiplicatively linked, for example, in a link 132 with a base value BW of an injection pulse width $t_{inj}$ predetermined as a function of operating parameters of internal combustion engine 10. Base values BW are stored in a memory 134 of control unit 16. Here, too, the operating parameters are preferably, but not necessarily, the load and the rotational speed of internal combustion engine 10. Fuel is injected via injectors 22 into combustion chambers 20 of internal combustion engine 10 with the injection pulse width $t_{inj}$ resulting from the product.

In this way, a regulation of the oxygen fill level of catalytic converter 26 taking place in a second control loop is superimposed on a conventional lambda regulation taking place in a first control loop. In the process, average oxygen fill level $\bar{\theta}_{mod}$ modeled with the aid of system model 100, or with the aid of first catalytic converter model 102, is adjusted, for example, to a setpoint value $\bar{\theta}_{set,fit}$, which minimizes the probability of breakthroughs toward lean and rich and thus results in minimal emissions. Since the base lambda setpoint value BLSW in this case is formed by inverted second system model 104, the control deviation of the fill level regulation is equal to zero if modeled average fill lever $\bar{\theta}_{mod}$ is identical to pre-filtered setpoint fill level $\bar{\theta}_{set,fit}$. Fill level control algorithm 124 intervenes only if this is not the case. Since the formation of the base lambda setpoint value acting virtually as a pilot control of the fill level regulation is implemented as inverted second catalytic converter model 104 of first catalytic converter model 102, this pilot control may be adapted by analogy with the adaption of first catalytic converter model 102 on the basis of signal $\lambda_{in,meas}$ of second exhaust gas sensor situated downstream from three-way catalytic converter 26. This is illustrated in FIG. 3 by the branch of adaption path 116 leading to inverted system model 104.

This implementation of the pilot control as an inversion of the system model has the advantage that fill level control algorithm 124 need only intervene if the actual fill level of the catalytic converter modeled with the aid of the system model deviates from filtered fill level setpoint value $\overline{\theta}_{set,fit}$ or from unfiltered fill level setpoint value $\overline{\theta}_{set}$. While system model 100 converts the input lambda upstream from the catalytic converter into an average oxygen fill level of the catalytic converter, the pilot control implemented as inverted system model 104 converts the average setpoint oxygen fill level into a corresponding setpoint lambda upstream from the catalytic converter.

In the subject matter of FIG. 3, inverted system model 104 is present as an analytical element, i.e., an element present in the form of an equation system and inverse to system model 100. A catalytic converter, however, is a complex, non-linear system having time-variant system parameters, which generally may only be represented by a non-linear differential equation system. The result of this, typically, is that the equation system for inverted system model 104 cannot be solved analytically.

Figure 4:
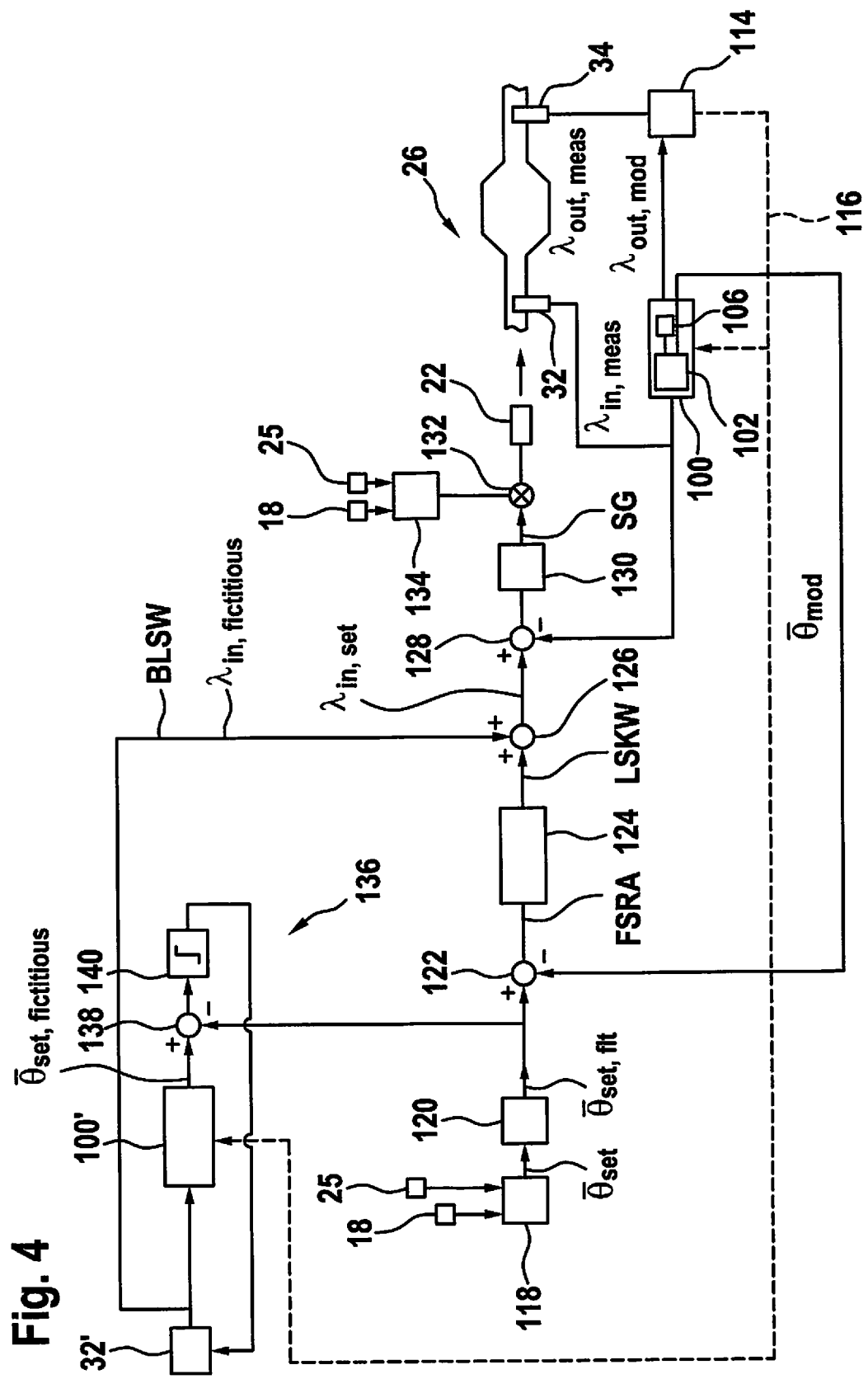
FIG. 4 shows a function block diagram of one exemplary embodiment of a method and control unit according to the present invention.

FIG. 4 shows an exemplary embodiment of the present invention in the form of a function block diagram. In this exemplary embodiment, the solvability problems of the subject matter of FIG. 3 are avoided. The subject matter of FIG. 4 differs from the subject matter of FIG. 3 in that a pilot control 136 is replaced not by an analytical, inverted system model 104, but by a numerically inverted mathematical model, which is based on an assumed to be known first system model 100 for catalytic converter 26. Pilot control 136 includes a second system model 100', the equation system of which is identical to the equation system of first system model 100, but is fed with other input variables. The configuration and the functions of the remaining blocks of FIG. 4 are otherwise each identical to the configuration and the functions of the identically numbered blocks from FIG. 3. For an explanation of these blocks and their configuration, explicit reference is made herewith to the description of FIG. 3.

The present invention is based on the following consideration. A fictitious value $\lambda_{in,fictitious}$ is predefined using a lambda actual value sensor block 32' as an input variable for second system model 100' of pilot control 136. Using second system model 100', a fictitious value ($\overline{\theta}_{set,fictitious}$) for the average oxygen fill level of catalytic converter 26 results from this input variable. In the link 138, the difference is calculated from fictitious average fill level ($\overline{\theta}_{set,fictitious}$) and fill level setpoint value $\overline{\theta}_{set,fit}$ filtered via optional filtering 120 or unfiltered fill level setpoint value $\overline{\theta}_{set}$. If both values ($\overline{\theta}_{set,fictitious}$) and $\overline{\theta}_{set,fit}$ (or $\overline{\theta}_{set}$) are identical, the difference is equal to zero. This means that predefined fictitious lambda value $\lambda_{in,fictitious}$ corresponds exactly to lambda setpoint value BLSW, which must be pilot-controlled in order to achieve the setpoint oxygen fill level. In threshold value block 140, the difference between fictitious average fill level ($\overline{\theta}_{set,fictitious}$) and fill level setpoint value $\overline{\theta}_{set,fit}$ filtered by optional filtering 120 or unfiltered fill level setpoint value $\overline{\theta}_{set}$ is compared with a predefined threshold value. If the degree of difference is sufficiently small, which is adjustable via the choice of the variable of the threshold value, then threshold value block 140 supplies lambda actual value sensor block 32' with a signal representing this fact. In response to this signal, lambda actual value sensor block 32' retains its output signal $\lambda_{in,fictitious}$ thus recognized as accurate and transfers this signal to link 126 as base lambda setpoint value BLSW.

If this difference in the value calculated from fictitious average fill level ($\overline{\theta}_{set,fictitious}$) and fill level setpoint value $\overline{\theta}_{set,fit}$ filtered by optional filtering 120 or unfiltered fill level setpoint value $\overline{\theta}_{set}$ on the other hand is greater than the threshold value, this means that predefined fictitious lambda value $\lambda_{in,fictitious}$ does not yet correspond to ideal lambda setpoint value BLSW, which must be pilot controlled in order to achieve the setpoint oxygen fill level. In threshold value block 140, the difference between fictitious average fill level ($\overline{\theta}_{set,fictitious}$) and fill level setpoint value $\overline{\theta}_{set,fit}$ filtered by optional filtering 120 or unfiltered fill level setpoint value $\overline{\theta}_{set}$ will then exceed the predefined threshold value. In this case, threshold value block 140 supplies a signal to lambda actual value sensor block 32' representing this fact. In response to this signal, lambda actual value sensor block 32' starts to iteratively vary its output signal $\lambda_{in,fictitious}$ thus recognized as inaccurate and transfers the iteratively varying output signal $\lambda_{in,fictitious}$, in particular, to system model 100'. This second system model 100', with respect to first system model 100, is then iterated with identical parameters and initially identical state variables as first system model 100 with variable input lambda $\lambda_{in,fictitious}$ until the difference between fill level v calculated by second system model 100' and filtered fill level setpoint value $\overline{\theta}_{set,fit}$ or unfiltered fill level setpoint value $\overline{\theta}_{set}$ is sufficiently small in magnitude in order to achieve the required accuracy of the pilot control. The required accuracy is adjustable by the choice of the threshold value in block 140. The value thus found for input lambda $\lambda_{in,fictitious}$ is then used as base lambda setpoint value BLSW for the first control loop. The difference formation represents merely one embodiment of a comparison of fictitious average fill level ($\overline{\theta}_{set,fictitious}$) with fill level setpoint value $\overline{\theta}_{set,fit}$ filtered by optional filtering 120 or unfiltered fill level setpoint value $\overline{\theta}_{set}$. A comparison may also be made, for example, on the basis of a quotient formation.

The advantage of this approach is that merely the equation system for forward system model 100, or 100' need be solved one more time, not however, the equation system for backward system model 104 from FIG. 3, solvable only with significant computing effort or insolvable.

To minimize the computing effort in control unit 16, iteration limits are preferably established for input lambda $\lambda_{in,fictitious}$, which determine the range, in which the iteration is carried out. These iteration limits are preferably established as a function of the instantaneous operating conditions. It is advantageous, for example, to carry out the iteration only in a preferably small interval to obtain setpoint lambda BLSW to be expected. It is further advantageous when establishing the iteration limits to take into consideration the intervention of fill level regulation 124 and interventions of other functionalities in setpoint lambda BLSW.

The equation system to be solved iteratively is solved iteratively within this interval using inclusion methods such as, for example, bisection methods or false position methods. Inclusion methods, such as the false position methods are generally known. They are distinguished by the fact that they not only supply iterative approximate values, but that they also limit these from both sides. The computing effort for determining the correct base lambda setpoint value BLSW is significantly limited as a result.

The specific pilot control 136 of FIG. 4 replaces inverted system model 104 from FIG. 3. An equivalent adaption of the pilot control with respect to its technical effect for adapting inverted system model 104 from FIG. 3 takes place in the subject matter of FIG. 4 via path 116 leading from block 114 to second system model 100'.

All elements depicted in FIG. 4, with the exception of exhaust system 26, of exhaust gas sensors 32, 34, of mass air-flow sensor 18, of rotation angle sensor 25 and of injectors 22, are components of a control unit 16 according to the present invention. All remaining elements from FIG. 4, with the exception of memories 118, 134, are parts of engine control program 16.1, which is stored and runs in control unit 16.

Elements 22, 32, 128, 130 and 132 form the first control loop, in which a lambda regulation takes place, in which signal $\lambda_{in,meas}$ of first exhaust gas sensor 32 is processed as the lambda actual value. Lambda setpoint value $\lambda_{in,set}$ of the first control loop is formed in the second control loop, which includes elements 22, 32, 100, 122, 124, 126, 128, 132.

Figure 5:
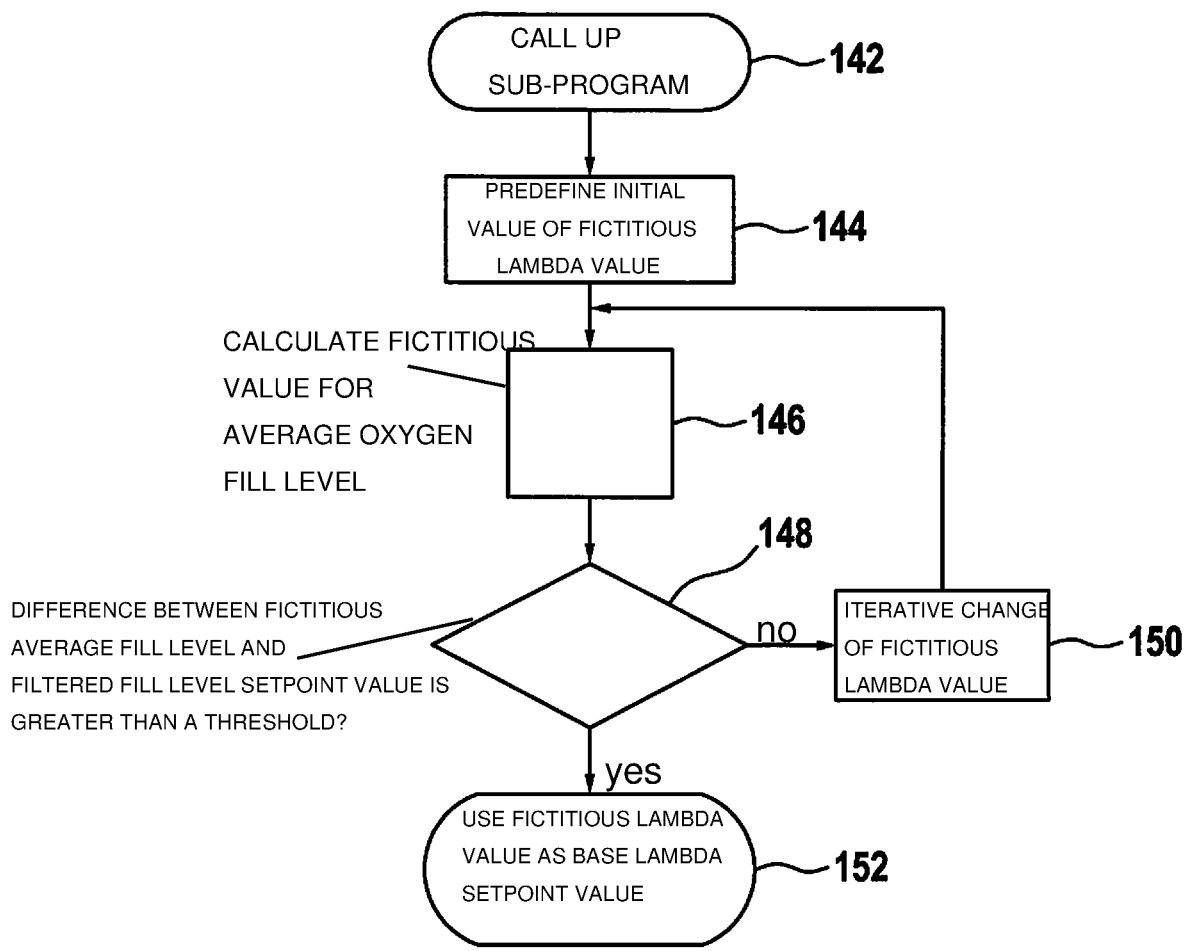
FIG. 5 shows a flow chart as an exemplary embodiment of a method according to the present invention, in each case above in schematic form.

FIG. 5 shows a flow chart as an exemplary embodiment of a method for carrying out the pilot control explained with respect to FIG. 4. The flow chart is preferably carried out as a sub-program of engine control program 16.1 from FIG. 1.

In step 142, the sub-program is called up from superior parts of engine control program 16.1. In step 144, an initial value of fictitious lambda value $\lambda_{in,fictitious}$ is predefined. Based on this, fictitious value ($\bar{\theta}_{set,fictitious}$) for the average oxygen fill level of the catalytic converter is calculated in step 146 using the equations of system model 100' (which are identical to the equations of system model 100). In step 148, the difference between fictitious average fill level ($\bar{\theta}_{set,fictitious}$) and filtered fill level setpoint value ($\bar{\theta}_{set,fit}$) or unfiltered fill level setpoint value $\bar{\theta}_{set}$ is calculated and compared with a predefinable threshold value. If the difference is greater than the threshold value, an iterative change of fictitious lambda value $\lambda_{in,fictitious}$ and a branching take place in step 150 prior to step 146. The loop from steps 146, 148 and 150 is passed through repeatedly, if necessary, a change of fictitious lambda value $\lambda_{in,fictitious}$ taking place with each passage in step 150. If in step 150 the difference between fictitious average fill level ($\bar{\theta}_{set,fictitious}$) and filtered fill level setpoint value ($\bar{\theta}_{set,fit}$) is smaller than the threshold value, then no further change of fictitious lambda value $\lambda_{in,fictitious}$ takes place in this execution of the sub-program, and the sub-program branches in step 152, in which fictitious lambda value $\lambda_{in,fictitious}$ ascertained up to this point is used as base lambda setpoint value BLSW.

What is claimed is:

1. A method for regulating a filling of an exhaust gas component storage of a catalytic converter in an exhaust gas of an internal combustion engine, comprising:
   ascertaining an actual fill level of the exhaust gas component storage using a first system model;
   feeding to the first system model a signal of a first exhaust gas sensor projecting into an exhaust gas flow upstream from the catalytic converter and detecting a concentration of the exhaust gas component;
   predefining in the first system model a base lambda setpoint value for a first control loop, the predefining being performed by a second control loop;
   converting, in the second control loop, an initial value for the base lambda setpoint value into a fictitious fill level by a second system model identical to the first system model;
   comparing the fictitious fill level with a setpoint value for a fill level, the comparing producing a comparison result; and
   iteratively changing the base lambda setpoint value as a function of the comparison result, if the comparison result indicates a difference between the setpoint value for the fill level and the fictitious fill level that is greater than a predefined degree, wherein the base lambda setpoint value is not changed if the comparison result indicates no difference between the setpoint value for the fill level and the fictitious fill level.

2. The method as recited in claim 1, further comprising:
   ascertaining and processing by a fill level regulation a deviation of the actual fill level from the setpoint value for the fill level in order to form a lambda setpoint value correction value;
   forming a sum from the base lambda setpoint value and the lambda setpoint value correction value;
   forming a correction value on the basis of the sum; and
   influencing a fuel metering to at least one combustion chamber of the internal combustion engine by the correction value.

3. The method as recited in claim 1, wherein:
   the exhaust gas component is oxygen,
   a lambda regulation takes place in the first control loop,
   the lambda regulation includes processing the signal of the first exhaust gas sensor as a lambda actual value,
   a lambda setpoint value is formed in the second control loop,
   a fill level control deviation is formed as a deviation of the fill level modeled using the first catalytic converter model from the filtered fill level setpoint value,
   the fill level control deviation is fed to a fill level control algorithm that therefrom forms a lambda setpoint value correction value,
   the lambda setpoint value correction value is used to form a sum by being added to the iteratively changed base lambda setpoint value, and
   the sum forms the lambda setpoint value.

4. The method as recited in claim 1, wherein the first system model contains a catalytic converter model.

5. The method as recited in claim 4, wherein the catalytic converter model includes an input emissions model and a fill level and emissions level model.

6. The method as recited in claim 5, wherein the catalytic converter model includes sub-models, each of which is assigned a sub-volume of the catalytic converter.

7. The method as recited in claim 5, wherein:
   the catalytic converter model includes an output lambda model that is configured to convert with the aid of the first catalytic converter model calculated concentrations of individual exhaust components into a signal that corresponds to a signal of a second exhaust gas sensor situated downstream from the catalytic converter and exposed to the exhaust gas.

8. The method as recited in claim 7, wherein the signal calculated using the output lambda model is balanced with the signal measured by the second exhaust gas sensor.

9. The method as recited in claim 7, wherein:
   the catalytic converter is a three-way catalytic converter, and
   parameters of the first system model are successively changed until a lambda value modeled for the exhaust gas flowing out of the three-way catalytic converter corresponds to a lambda value measured at the three-way catalytic converter.

10. The method as recited in claim 1, wherein the predefined base lambda setpoint value amounts to between 10% and 50% of a maximum oxygen storage capacity of the catalytic converter.

11. The method as recited in claim 1, wherein the predefined base lambda setpoint value amounts to between 25% and 35% of a maximum oxygen storage capacity of the catalytic converter.

12. A control unit for regulating a filling of an exhaust gas component storage of a catalytic converter in an exhaust gas of an internal combustion engine, comprising:
   an arrangement for ascertaining an actual fill level of the exhaust gas component storage using a first system model;
   an arrangement for feeding to the first system model a signal of a first exhaust gas sensor projecting into an exhaust gas flow upstream from the catalytic converter and detecting a concentration of the exhaust gas component;
   an arrangement for predefining in the first system model a base lambda setpoint value for a first control loop, the predefining being performed by a second control loop;
   an arrangement for converting, in the second control loop, an initial value for the base lambda setpoint value into a fictitious fill level by a second system model identical to the first system model;
   an arrangement for comparing the fictitious fill level with a setpoint value for a fill level, the comparing producing a comparison result; and
   an arrangement for iteratively changing the base lambda setpoint value as a function of the comparison result, if the comparison result indicates a difference between the setpoint value for the fill level and the fictitious fill level that is greater than a predefined degree, wherein the base lambda setpoint value is not changed if the comparison result indicates no difference between the setpoint value for the fill level and the fictitious fill level.

13. The control unit as recited in claim 12, further comprising:
   an arrangement for ascertaining and processing by a fill level regulation a deviation of the actual fill level from the setpoint value for the fill level in order to form a lambda setpoint value correction value;
   an arrangement for forming a sum from the base lambda setpoint value and the lambda setpoint value correction value;
   an arrangement for forming a correction value on the basis of the sum; and
   an arrangement for influencing a fuel metering to at least one combustion chamber of the internal combustion engine by the correction value.

* * * * *